(12) United States Patent
Behrendt et al.

(10) Patent No.: US 8,140,680 B2
(45) Date of Patent: Mar. 20, 2012

(54) MACHINE-PROCESSABLE SEMANTIC DESCRIPTION FOR RESOURCE MANAGEMENT

(75) Inventors: Michael M. Behrendt, Randersacker (DE); Gerd Breiter, Wildberg (DE); Martin Reitz, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 12/350,267

(22) Filed: Jan. 8, 2009

(65) Prior Publication Data
US 2009/0177777 A1 Jul. 9, 2009

(30) Foreign Application Priority Data
Jan. 9, 2008 (EP) .................................... 08100236

(51) Int. Cl.
*G06F 15/173* (2006.01)
(52) U.S. Cl. ....................... 709/226; 709/223
(58) Field of Classification Search ........... 709/223–226
See application file for complete search history.

(56) References Cited

U.S. PATENT DOCUMENTS

| | | | | |
|---|---|---|---|---|
| 5,220,674 A * | 6/1993 | Morgan et al. | ................ | 709/223 |
| 7,062,561 B1 * | 6/2006 | Reisman | ........................ | 709/227 |
| 7,246,146 B1 * | 7/2007 | Ims et al. | ...................... | 709/203 |
| 7,536,673 B2 * | 5/2009 | Brendle et al. | ................ | 717/102 |
| 2001/0025312 A1 * | 9/2001 | Obata | .......................... | 709/226 |
| 2003/0093551 A1 * | 5/2003 | Taylor et al. | .................. | 709/237 |
| 2003/0208473 A1 * | 11/2003 | Lennon | .............................. | 707/3 |
| 2003/0225785 A1 * | 12/2003 | Arellano | .................... | 707/104.1 |
| 2004/0003132 A1 * | 1/2004 | Stanley et al. | ................. | 709/316 |
| 2004/0008678 A1 * | 1/2004 | Matthews et al. | ............. | 370/389 |
| 2004/0153467 A1 * | 8/2004 | Conover et al. | ............... | 707/100 |
| 2004/0202185 A1 * | 10/2004 | Ratcliff et al. | ........... | 370/395.53 |
| 2007/0101000 A1 * | 5/2007 | Childress et al. | ............. | 709/226 |
| 2007/0124336 A1 * | 5/2007 | Arellano | .................... | 707/104.1 |
| 2007/0265847 A1 * | 11/2007 | Ross et al. | ..................... | 704/236 |
| 2008/0250390 A1 * | 10/2008 | Feblowitz et al. | ............ | 717/114 |
| 2009/0063224 A1 * | 3/2009 | Gorthi et al. | ....................... | 705/7 |
| 2009/0100090 A1 * | 4/2009 | Lee et al. | ...................... | 707/102 |
| 2009/0254904 A1 * | 10/2009 | Howard | ........................ | 718/100 |

OTHER PUBLICATIONS

Applying the Web ontology language to management information definitions de Vergara, J.E.L.; Villagra, V.A.; Berrocal, J.; Communications Magazine, IEEE Volume: 42 , Issue: 7 Digital Object Identifier: 10.1109/MCOM.2004.1316535 Publication Year: 2004 , pp. 68-74.*

(Continued)

*Primary Examiner* — Wing Chan
*Assistant Examiner* — Razu Miah
(74) *Attorney, Agent, or Firm* — Dennis Jung, Esq.; Kevin P. Radigan, Esq.; Heslin Rothenberg Farley & Mesiti P.C.

(57) ABSTRACT

A method and associated apparatus is provided for generating a machine-processable semantic description of a first manageable resource of an application domain. In accordance with an embodiment of the invention, the first manageable resource is characterized by a set of aspects. Accordingly, an ontology is provided for the application domain that provides a terminology and rules for describing the set of aspects of the first manageable resources of the application domain in a semantic way. The semantic description of the first manageable resource is then generated compliant to the terminology and the rules of the ontology to describe semantically the set of aspects.

19 Claims, 5 Drawing Sheets

OTHER PUBLICATIONS

Semantic management of distributed Web applications Oberle, D.; Staab, S.; Eberhart, A.; Distributed Systems Online, IEEE vol. 7, Issue: 5 Digital Object Identifier: 10.1109/MDSO.2006.33 Publication Year: 2006.*

Creating Semantic Web contents with Protege-2000 Noy, N.F.; Sintek, M.; Decker, S.; Crubezy, M.; Fergerson, R.W.; Musen, M.A.; Intelligent Systems, IEEE vol. 16, Issue: 2 Digital Object Identifier: 10.1109/5254.920601 Publication Year: 2001, pp. 60-71.*

* cited by examiner

MACHINE-PROCESSABLE SEMANTIC DESCRIPTION FOR RESOURCE MANAGEMENT

BACKGROUND OF THE INVENTION

1. Field of the Invention

The present invention relates to a method and an apparatus for generating machine-processable semantics used for resource management of application domains.

2. Description of Background

The term application domain is used in the context of this document in order to refer to an application landscape management domain. An application landscape management domain can be regarded as an entity through which on-demand services of an on-demand information technology (IT) infrastructure are provided to one or more client systems that make use of these services.

On-demand services are provided by a technology called on-demand computing or utility computing, also known as cloud computing. Utility computing relates to the provision of computing resources, such as computation and storage, as a metered service to clients similar to a physical public utility such as for example water or natural gas. Utility computing provides the advantage of a low or no initial cost to acquire hardware. Instead, computational resources are essentially rented. Customers with very large computations or a sudden peak in demand can also avoid the delays that would result from physically acquiring and assembling a large number of computers.

Conventional internet hosting services have the capability to quickly arrange for the rental of individual servers, for example to provide a bank of web servers to accommodate a sudden surge in traffic to a web site.

"Utility computing" usually envisions some form of virtualization so that the amount of storage or computing power available is considerably larger than that of a single time-sharing computer. Multiple servers are used on the "back end" to make this possible. This might be a dedicated computer cluster specifically built for the purpose of being rented out, or even an under-utilized supercomputer. The technique of running a single calculation on multiple computers is known as distributed computing.

The term "grid computing" is often used to describe a particular form of distributed computing, where the supporting nodes are geographically distributed or across administrative domains. To provide utility computing services, a company can "bundle" the resources of members of the public for sale, who might be paid with a portion of the revenue from clients.

Today's IT infrastructure resources are composed of a large number of heterogeneous, distributed resources. The key to build on-demand IT infrastructures from the heterogeneous and distributed resources is to provide means for managing these resources through a common, standards based interoperability between resources.

The Web Services Resource Framework (WSRF) introduces a technology to encapsulate each kind of resources behind web services interfaces. WSRF concentrates on the stateful characteristics of IT resources, for example the CPU temperature of a computer system. The states of resources are referred to as so-called resource properties. The sum of all resource properties for a specific resource is contained in the resource properties document which is a virtual XML document. WSRF defines a WS-resource as a stateful web service that is associated with a resource properties document describing its state. Resource properties and the whole resource properties document can be retrieved by standard web service calls defined by WSRF.

The web services stack includes the specification 'web services addressing' (WS-Addressing). It introduces the concept of endpoint reference (EPR) in order to normalize the addressing information typically provided by transport protocols and messaging systems. An EPR is an XML fragment that conveys the information that is needed to address a web service endpoint.

Web Services Distributed Management (WSDM) is a standard on top of WSRF that consists of two parts: a first part relates to the so-called Management using Web Services (MuWS) which is used to address basic mechanisms and message exchange patterns for managing WS-resources using web services as a communication protocol. It also defines relationships between WS-resources as a special kind of resource property. The second part relates to the so-called management of web services (MoWS) which deals with the management of web services itself that represent WS-resources. It can be viewed as both, an implementation and an extension of MuWS.

The core concept of WSDM is the so-called manageable resource (MR). A manageable resource is a WSRF WS-resource that offers a plurality of capabilities standardized within the WSDM specification. A manageable resource has three important documents associated with it. A WSDL document describes the manageable resource as a web service with an interface. The acronym WSDL refers to the web service definition language. Further, an XML schema document describes the structure of the resource properties document. Finally, the resource properties document itself describes the current state of the manageable resource in terms of values of the resource properties. A so-called manageability consumer can access the manageable resource using the predefined message exchange patterns that are defined as part of the specification of the capabilities. WSDM however only defines the interaction protocols with manageable resources. It does not define any standards for the implementation of manageable resources and the corresponding runtime requirements.

WS-Management describes a general SOAP-based protocol for managing systems like computer systems, devices, applications and other manageable entities. WS-management identifies a core set of web services specifications, usage requirements and a common set of operations that are central to all systems management. WS-management includes specifications for discovery and grouping of resources, setting and getting of properties, notification, and execution of specific management methods. In particular, it defines and recommends minimal implementation requirements for conformant web services implementations.

The Resource Description Framework (RDF) is a standard for symbolic knowledge representation in the semantic web. It is a framework for representing information about resources. Information is expressed at lowest granularity in form of RDF statements with a subject, a predicate, and an object. The three parts of the RDF statement are URI references (URIrefs) a special kind of URI with optional fragment identifiers that allow addressing instances within a base URI. Using URI references for subject, predicate, and partly object of statements, RDF supports the use of shared vocabularies for describing resources. Predicates and resources are defined in shared vocabularies and referenced in URIrefs of RDF statements. RDF is based on the graphical RDF graph model which defines an RDF graph as a collection of RDF statements. There are several representation formats for RDF graphs. RDF/XML provides syntax to serialize RDF graphs as XML documents. It comprises a predefined vocabulary that is used to render RDF graphs in XML.

RDF comes along only with a rudimentary vocabulary. The domain-specific vocabulary used to describe resources of an application domain is intended to be declared somewhere outside of RDF and then referenced from the RDF statements. One aspect of such ontology is to provide a domain-specific vocabulary. It provides terms in which resources are described and constitutes context that adds semantics to the descriptions. An ontology is a hierarchical and related structure of concepts that can be identified in a domain together with additional information that nearer describes the concepts and how they are related to each other. The OWL Web ontology Language, for which the recursive acronym OWL is used, offers a vocabulary that builds upon RDF and RDF Schema and thus provides means to model sophisticated ontology's as RDF graphs.

WSRF and WSDM, the established technologies for defining and implementing manageable resources, operate on a syntactical level. The resource properties and relationships of a manageable resource are specified as XML elements in an XML schema document. The resource properties document describing the current state of the manageable resource is an XML document. It provides access to the resource properties on a syntactical level. Resource properties are XML elements that can be accessed through the names and that contain XML fragments or literal data such as values. The manageable resources operations are described in the WSDL document either on a syntactical level of input- or output-messages. No assertions about their semantics are made explicit except for their naming and documentation. This kind of information is not accessible for machines, for example for manageability consumers of the application domain.

The mentioned aspects of manageable resources, namely resource properties, relationships, their values and operations, are described only syntactically. No assertions about their semantics are made. Other aspects of manageable resources like the description of manageable resources itself containing entities are not formalized at all. This results in a lack of possibilities how client systems such as the above mentioned manageability consumer can access and manipulate manageable resources. Further, applications executed on the clients have no explicit domain model available that gives a description of the manageable resources of the application domain. Applications are only dealing with syntactical constructs and have to implicitly assume the semantics. They access resource properties by their names and get returned XML elements as values, process literal data, construct XML documents as messages and forward them to manageable resources operations. Consequently, it is desirable to have a method and apparatus that can describe at least one or more aspects of the manageable resources semantically.

SUMMARY OF THE INVENTION

The shortcomings of the prior art are overcome and additional advantages are provided through the provision of method and apparatus for generating a machine-processable semantic description of a first manageable resource of an application domain. In accordance with an embodiment of the invention, the first manageable resource is characterized by a set of aspects. Accordingly, an ontology is provided for the application domain that provides a terminology and rules for describing the set of aspects of the first manageable resources of the application domain in a semantic way. The semantic description of the first manageable resource is then generated compliant to the terminology and the rules of the ontology to describe semantically the set of aspects.

In accordance with another embodiment of the invention, the first manageable resource is hosted by a data processing system of the application domain. The data processing system is linked with a client of the application domain. The semantic description is generated by the first manageable resource in response to the reception of a request from the client. The semantic description is then sent from the data processing system to the client.

In accordance with yet another embodiment of the invention, the first manageable resource is adapted to generate the semantic description in response to a client's request compliant to the terminology of the ontology. The ontology is thus known to the first manageable resource. The first manageable resource can be regarded as a computer program product hosted by the data processing system. The first manageable resource is then programmed to make use of the ontology for the generation of the semantic information. The ontology might for example be implicitly hard-coded in the program code of the first manageable resource by the programmer of the first manageable resource. The first manageable resource generates a semantic description by usage of the ontology's terminology in response to the reception of a request from the client. In one embodiment, the client has a knowledge base and a reasoner and stores the received semantic description and scans the semantic description for import statements. In an alternate embodiment, the client receives semantic information about the set of aspects of the first manageable resource and generates the semantic description of the first manageable resource by itself. In one embodiment, the client can store the generated semantic description in its knowledge base and scans the semantic description for OWL import statements. The client furthermore employs its reasoner for further processing of the semantic information in the knowledge base.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
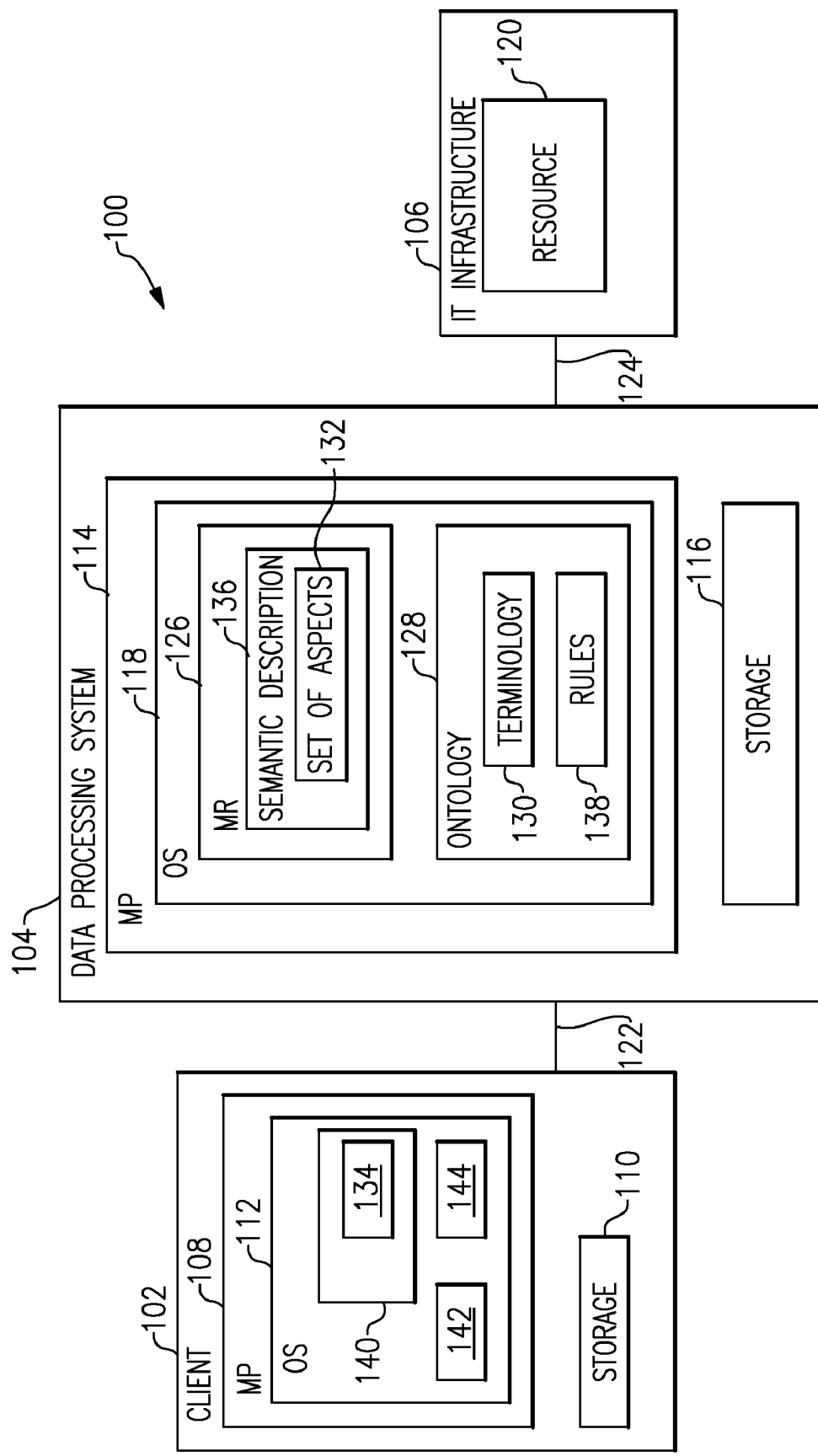
FIG. 1 is a block diagram of an application domain.

FIG. 1 is a block diagram of an application domain 100. The application domain 100 comprises a client 102, a data processing system 104, and an IT infrastructure 106. The client 102 can be regarded as a data processing system which has a microprocessor 108 and storage 110. The microprocessor 108 executes an operating system 112 which is permanently stored on the storage 110 and loaded for execution into the microprocessor 108. The operating system 112 host a computer program product 140 which can be regarded as client application program and a knowledge base 142 as well as a reasoner 144. The computer program product 140, the knowledge base 142 as well as the reasoner 144 are programs, whereby the corresponding codes are stored on the storage 110 and loaded for execution into the microprocessor 108.

The data processing system 104 can also be regarded as a computer system and has a microprocessor 114 and storage 116, whereby the microprocessor 114 executes an operating system 118, which is loaded for execution from the storage 116 into the microprocessor 114. In view of the client 102, the data processing system 104 can be regarded as a server system. The IT infrastructure 106 can be regarded as a data processing system or a network interconnecting a plurality of data processing systems and that host one or more resources like devices, services, storage, and so on, such as resource 120. The client 102, the data processing system 104, and the IT infrastructure 106 are connected over network connections, such as network connection 122 and 124.

The resource 120 is a real resource by which a service or a functionality can be provided to, for example, the client 102. The resource 120 can however not be accessed directly by the client 102. The operating system 118 hosts a manageable resource 126 associated with the resource 120 which provides a web service through which the client 102 can make use of the underlying resource 120 in a standardized way. The manageable resource 126 can be regarded as an abstraction of the underlying resource 120.

The operating system 118 provides also an ontology 128 which is for example provided in form of OWL. One aspect of the ontology 128 is that it provides a terminology 130 which is specific to the application domain 100. The terminology 130 therefore provides means to describe semantically the resources and to constitute context that adds semantics to the description of the resources. The ontology 128 therefore is a hierarchical and related structure of concepts that can be identified in the application domain together with additional information that nearer describe the concepts and how they are related to each other. In particular, all identified concepts of the application domain 100 are reflected in OWL classes. The OWL classes as well as the inter-relations are further described in the ontology using OWL constructs like OWL properties or additional technologies like rules.

The current state of the application domain 100 is therefore further described in an RDF graph. It contains RDF statements that describe the resources in the domain as instances of the ontology classes. The terminology 130 of the ontology 128 provides the vocabulary to express the instance assertions in RDF. The ontology is the context for the RDF graph that is necessary to add semantics or meaning to the statements. As an OWL ontology is serialized in RDF, together with the RDF graph describing the instance, it comprises a complete seamless semantic description of the domain's current state.

Another aspect of the ontology 128 is that it provides rules 138. The rules 138 provide instructions how to interfere on and how to process RDF statements based in the ontology. Reasoning thus allows logical access to and processing of the information offered in the RDF graph on the basis of the rules 138.

The manageable resource 126 is further characterized by a set of aspects 132 that provide a description of the properties of the manageable resource 126 as well as a specification of the current state of the manageable resource 126. The client 102 might be interested in getting semantic information about the manageable resource 126. The client therefore sends a request 134 via the network connection 122 to the data processing system 104. The request 134 is used to request for a semantic description 136 of the manageable resource 126. In response to the reception of the request 134, the manageable resource 126 generates the semantic description 136 which is compliant to the terminology 130 of the ontology 128 and which describes semantically the set of aspects 132.

The manageable resource 126 is therefore programmed in a way so that it generates a semantic description compliant to the ontology 128. The ontology's terminology 130 is implicitly assumed within the computer code of the manageable resource 126.

The semantic description 136 is sent to the client 102. The semantic description 136 comprises in particular semantic information about the set of aspects 132 that reflects the properties and the current state of the manageable resource 126. The client therefore receives a semantic description of the web service implemented via the manageable resource 126.

The computer program product 140 is further adapted to search the semantic description 136 for OWL import statements. The RDF graph comprised in the semantic description 136 is formally realized as an own OWL ontology. This allows OWL import statements that reference the underlying ontology 128 which provides the context. Each found part of the ontology that is not already loaded in the knowledge base 142 is retrieved by the client 102 from the ontology 128. This could be realized through a message exchange pattern of a HTTP GET request sent by the client 102 to the system 104 and a corresponding HTTP GET response sent from the data processing system to the client 102. Alternatively, the ontology 128 could be provided by a Web service. Here, the ontology would be retrieved with a Web service/SOAP call.

Finally, the semantically aware client 102 stores the retrieved parts of the ontology in the knowledge base 142 and invokes the reasoner 144 to perform on the basis of the rules 138 inference on and processing of the knowledge in the knowledge base.

Figure 2:
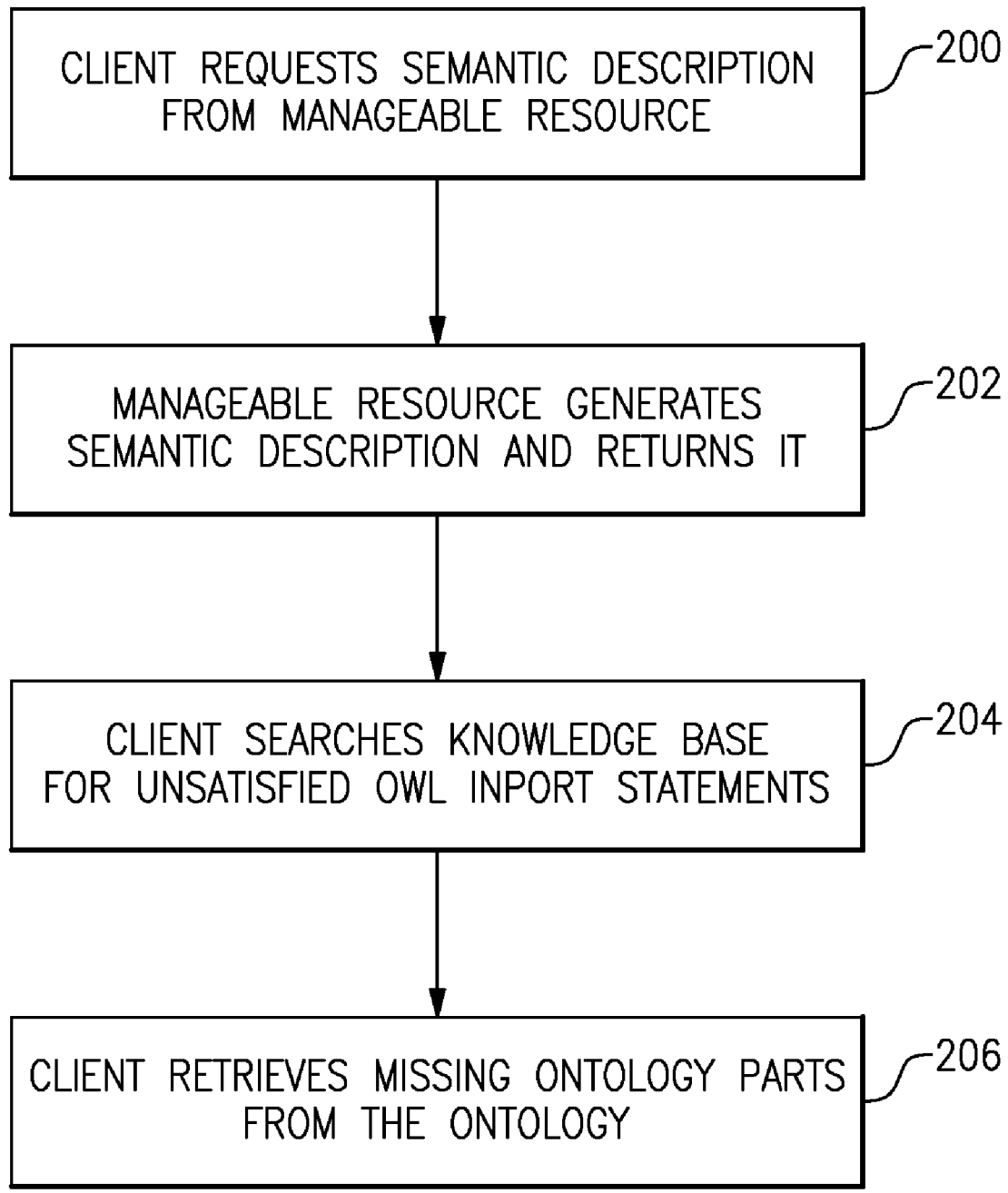
FIG. 2 is a flow diagram illustrating steps performed by a method in accordance with the invention.

FIG. 2 shows a flow diagram illustrating basic steps performed by a method of generating a machine-processable semantic description of a manageable resource of an application domain in accordance with the invention. According to step 200, a client requests a semantic description from a manageable resource. The manageable resource comprises an ontology of the application domain in a hard-coded form and is therefore able to generate the semantic description in form of an RDF graph in which aspects of the manageable resource are described semantically and comply with the ontology. The semantic description is then according to step 202 sent to the client. According to step 204, the client receives the RDF graph and searches it for unsatisfied OWL import statements. The client accesses then the ontology of the application domain which might be provided for example by an ontology service and retrieves the missing parts of the ontology that relate to the unsatisfied OWL import statements.

Figure 3:
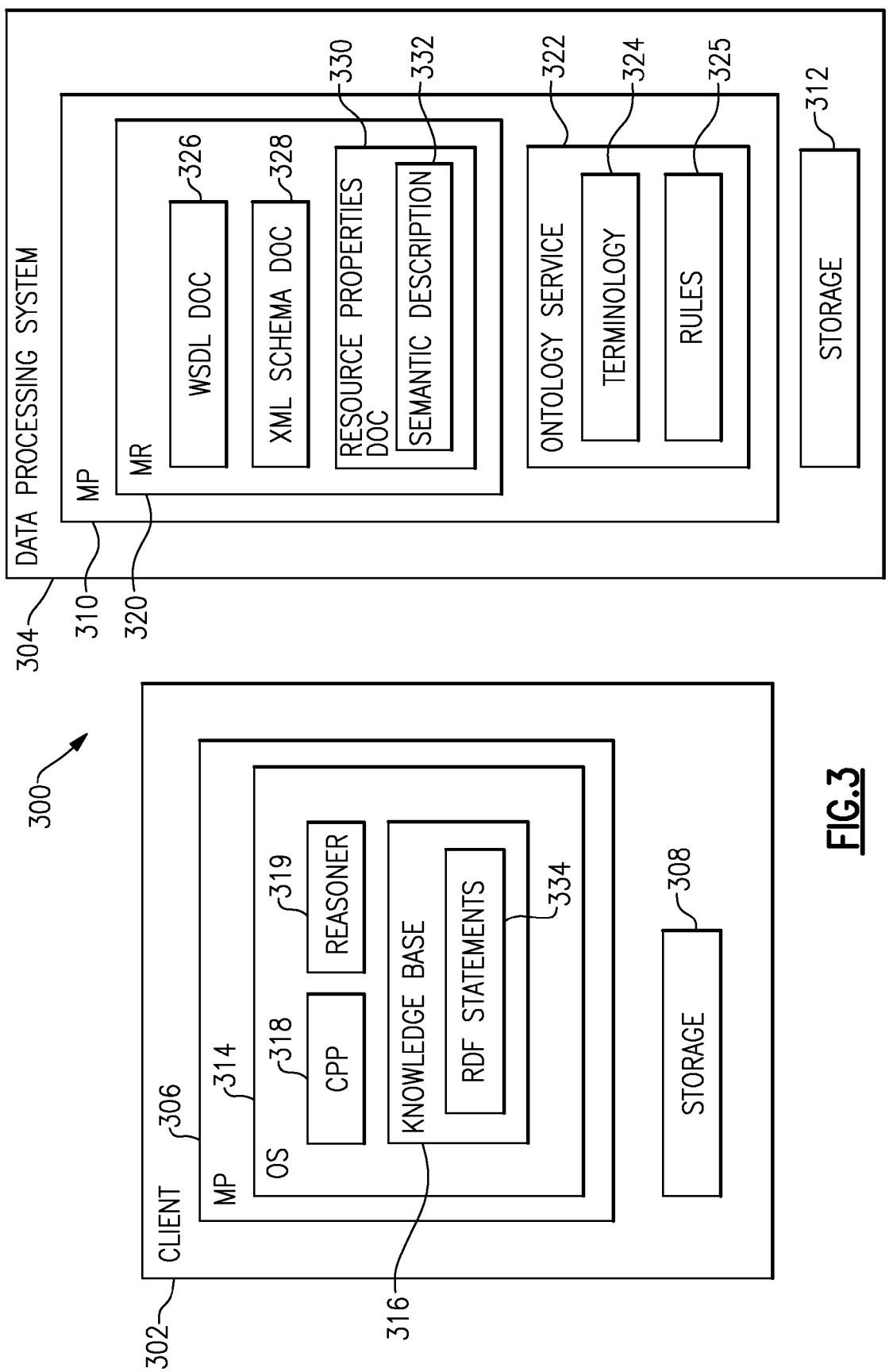
FIG. 3 is a block diagram of another application domain.

FIG. 3 shows a block diagram of an application domain 300 comprising a client 302 and a data processing system 304. The client 302 comprises a microprocessor 306 and storage 308 and the data processing system 304 comprises a microprocessor 310 and storage 312. The client's microprocessor 306 executes an operating system 314 which is permanently stored on the storage 308 and loaded for execution into the microprocessor 306. The operating system 314 further hosts a knowledge base 316, a computer program product 318, and a reasoner 319. The knowledge base 316, the computer program product 318, and the reasoner 319 are computer programs, whereby the corresponding program codes are permanently stored in storage 308. Moreover, the knowledge base 316 can be regarded as a database system which is adapted to maintain and control data stored in the knowledge base 316.

The microprocessor 310 of the data processing system 304 executes a computer program product which corresponds to a manageable resource 320 that is associated with an underlying resource that is hosted by an IT infrastructure that is, for simplicity reasons, not shown in FIG. 3. The microprocessor 310 further executes an ontology service 322 which provides a terminology 324 for describing in a semantic way concepts and characteristics of the domain 300. The ontology 322 furthermore comprises rules 325 used to interfere on and process semantic information that is compliant with the ontology.

The manageable resource 320 is associated with three documents. The manageable resource 320 is associated with a WSDL document 326 which is used to describe the manageable resource 320 as a web service with an interface. An XML schema document 328 describes the structure of a resource properties document 330.

The client 302 employs the knowledge base 316 to store domain specific information in form of RDF statements 334. The RDF statements 334 are the building blocks of RDF graphs which are collections of statements that form an ontology or describe in the context of this document manageable resources. Some of the RDF statements 334 thus relate to manageable resources which semantically describe them as instances of the corresponding classes of the ontology as provided by the ontology service 322. In this way, all information about the domain 300, its model and its current state, is represented seamlessly at the database 316 and thus at a single point which is accessible by the client 302.

The reasoner 319 provides means to interfere and to process the information stored in the database. This enables a thinner, more flexible application that achieves a higher degree of automation. In order to ensure that the RDF graphs of a manageable resource is always up to date and is representing the current state of the manageable resource, the RDF graph of a manageable resource is requested when required by the client. Thus, the computer program product 318 of the client 302 might request the resource properties document from the manageable resource 320 via a request.

A semantic description 332 in form of an RDF graph is then generated as part of the resource properties document 330 in response to the reception of the request. The semantic description 332 comprised in the resource properties document 330 is thereby generated by describing aspects of the manageable resource in a semantic way by use of the terminology 324. The semantic description 332 is then returned along with the resource properties document 330 to the client 302.

Alternatively, the RDF graph relating to the semantic description can also be retrieved separately without need to retrieve the complete resource properties document, e.g. by use of a GetResourceProperty( ) command querying the resource property containing the RDF graph.

The computer program product 318 extracts the semantic description 332 from the resource properties document 330 and stores the corresponding RDF graph in the knowledge base 316. The RDF graph of the manageable resource 320 is then searched for OWL import statements. The RDF graph might be formally realized as an OWL ontology. This allows OWL import statements that reference the underlying ontology as provided by the ontology service 322 which provides the context. Each found ontology that is not already loaded in the knowledge base 316 has to be retrieved from the ontology service 332 that maintains and provides the ontology. This is realized through a message exchange pattern which might for example be based on the HTTP protocol. Alternatively, the ontology service 322 could be realized as a web service. Here the ontology would be retrieved with a web service/SOAP call.

Accordingly, in an alternate embodiment, aspects of the manageable resource 320 are described in the meta-data with the semantic annotations of SAWSLD and additional constructs. This approach requires more effort but it is also a possible implementation. The effort for generating the semantic description comprising the RDF graph relating to the manageable resource 320 is then moved from the manageable resource 320 to the client 302.

The WSDL document 326 is then enriched with model Reference attributes and precondition and effect elements as intended by SAWSDL. Additional, classification of the manageable resource 320 itself and the URI of the underlying ontology might be specified in the WSDL document by proper attributes. This is not covered by SAWSDL. This might be achieved by a modelReference attribute of the enclosing WSDL XML element. The XML Schema document of the resource properties document 328 is also enriched with semantic annotations of SAWSDL. In this way, the resource properties are semantically described through modelReference attributes in their XML Schema declaration.

The client 302 retrieves then the WSDL document 326 and the XML schema document 328 from the manageable resource 320 with the message exchange pattern as specified in WS-MetadataExchange, thus by use of a GetMetadata( ) request and a corresponding response. Then, the client 302 retrieves the whole resource properties document 330 with the GetResourcePropertyDocument( ) request (the document 330 does in this case not include the semantic description 330!). The manageable resource generates the resource properties document 330 at the time of the request and returns the corresponding response. Then, the computer program product 318 evaluates all three documents and generates the RDF graph based on the semantic annotations and the resource properties. This results in an RDF graph that semantically describes the MR identical to the RDF graph that is generated by MR in the first approach. Finally, the client adds the generated RDF graph to the knowledge base 316.

The knowledge base 316 is then searched for unsatisfied OWL import statements, and the corresponding ontology's are retrieved from the ontology service 322 and finally the reasoner is invoked as described above.

Figure 4:
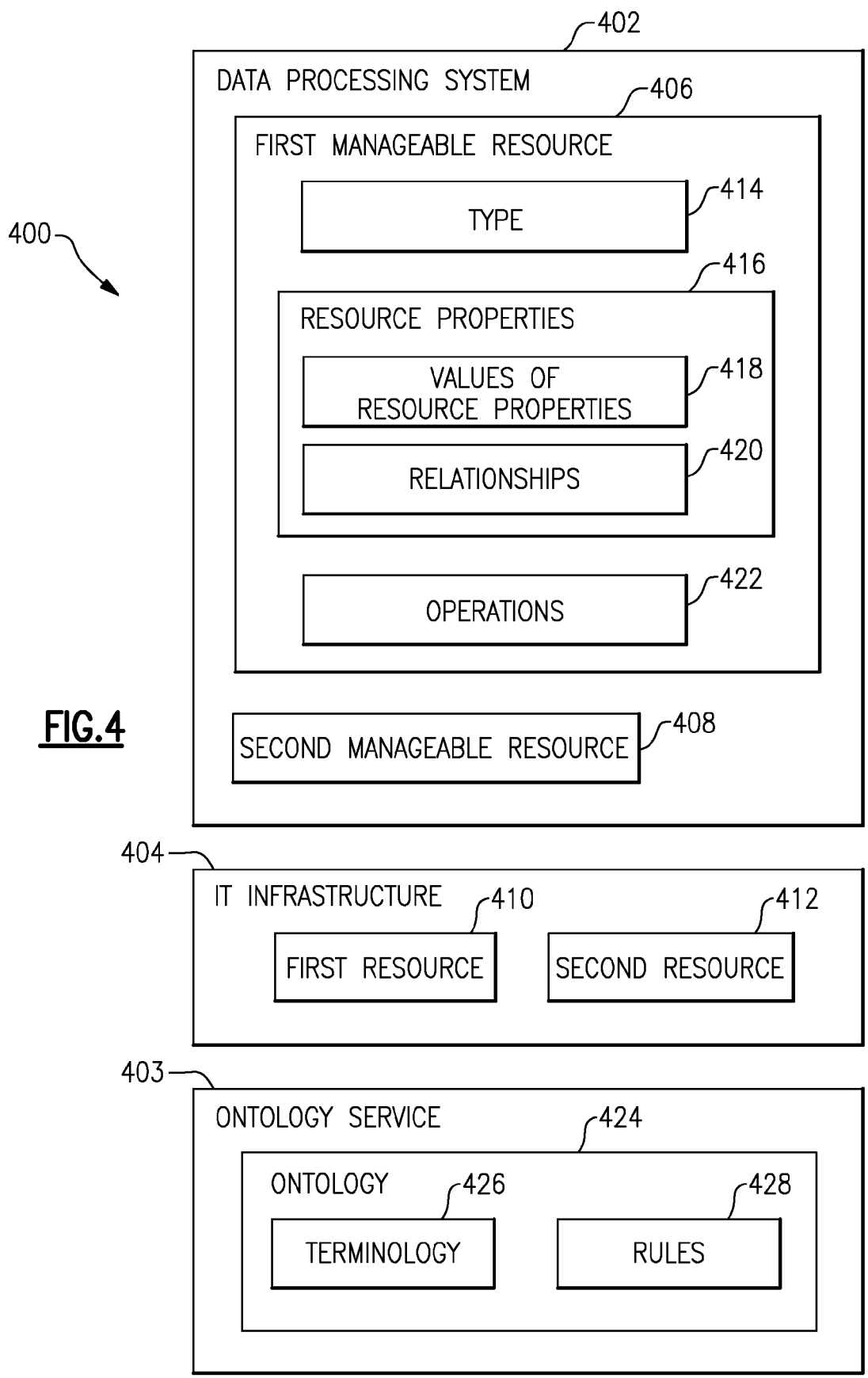
FIG. 4 is a block diagram of a further application domain.

FIG. 4 is a block diagram of a further application domain 400. The application domain 400 comprises a data processing system 402, an ontology service 403, and an IT infrastructure 404. The data processing system 402 provides stateful web services, for example for a requesting client, in form of a first manageable resource 406 and in form of a second manageable resource 408. The IT infrastructure 404 comprises a first resource 410 and a second resource 412. The first manageable resource 406 is associated with the first resource 410 and the second manageable resource 412 relates to the second manageable resource 408.

The ontology service 403 provides an ontology 424 containing in its terminology 426 a class instance each type of manageable resources of the domain 400 and rules 428 for operations. The first manageable resource is associated with a plurality of aspects that can be described semantically, for example by use of RDF statements. The first manageable resource 406 is of a certain type 414. The type 414 can be modeled as a class of the ontology 424 which must be provided for the application domain 400 by the ontology service 403. The first manageable resource 406 is further associated with resource properties 416. The resource properties 416 are used to describe the characteristics and the current state of the first manageable resource 406.

The resource properties 406 relate to values of resource properties 418. The values of resource properties 418 contain data-by-value and can be modeled as OWL datatype properties that contain literal data. The values of the resource properties can furthermore be modeled by a classification mechanism which is called value partitioning. Here, a set of subclasses provided by the terminology 426 represents the disjoint partitions of the value space. The value is classified in a way so that it is an instance of exactly one of the value partition subclasses.

The resource properties 416 also relate to relationships 420. The relationships 420, realized for example in form of WSDM relationships, can be regarded as the special kind of resource property that comprises endpoint references to other resources as data-by-reference. Thus, a relationship of the relationships 420 could specify an endpoint reference to the second resource 412, whereas the values of resource properties 418 exclusively relate to the first resource 410 with which the first manageable resource 406 is associated with. The relationships 420 can be modeled by OWL object properties that reference to the other resources, for example to the second resource 412 as mentioned before.

Another aspect which can be modeled semantically relates to operations 422 that are provided by the first manageable resource 406. The operations 422 can be modeled by the terminology 426. Each rule of the rules 428 provided by the ontology 424 comprises two parts, the so-called premises, head or precondition and the so-called conclusion, body or effect. The building blocks for the rules are terms of triple patterns that may contain variables. By variable binding, RDF statements can be matched. If the premise is satisfied by the current content of the knowledge base, the operation is applicable. In this case, the effect modifies the content of the knowledge base in a way, so that it reflects the outcome of the operations execution. The description format for the operations preconditions and effects is seamlessly integrated in the RDF graph as semantic description format for the manageable resource in this way.

The first manageable resource 406 might for example represent a computer system. Thus, the first resource 410 of the IT infrastructure 404 relates to the computer system. Its resource properties document might then contain a resource property named CPU temperature that has the value 84.42 and a relationship 'connected to' that contains an endpoint reference to some switch that might correspond to the second resource 412. Additionally, it provides an operation called 'throttle clock speed'. The understanding of the implied meaning in the names for the first manageable resource and its resource properties relies on additional knowledge in form of common sense and is still vague even for humans. As example, the question could be posed if the unit of the former resource property is Celsius or Fahrenheit? In order to make assertions about the semantics, the meaning of the first manageable resource 406 is expressed as a reference to an OWL class 'computer system' to state that this resource is of type computer system. The meaning of the resource property 'CPU temperature' is described with a reference to an OWL datatype property named 'CPU temperature'. The value is extended by a classification like 'critical' that provides the semantic behind the floating point number which is by itself meaningless. The semantic of the 'connected to' property is expressed by an OWL object property named 'connected to' that references somehow to the switch corresponding to the second resource 412.

Finally, the 'throttle clock speed' operation is associated with an effect that the CPU temperature will decrease. All semantic aspects, in this case the class 'computer system', the resource properties 'CPU temperature' and 'connected to', the operation 'throttle clock speed', as well as the classification of the values, are defined in an ontology which also contains information about how these aspects are related to each other and represent the applications domain model. A requesting client that uses the ontology or more particularly the terminology provided by the ontology as vocabulary to represent the state of the computer system can exploit the ontology to operate on the knowledge of a semantic, logic level. According to this scenario, it would be able to realize the critical situation and realize that 'throttle clock speed' is an operation to counteract the critical situation. In particular this can be accomplished without extra application code, only through exploitation of the offered knowledge in the proper representation format.

Figure 5:
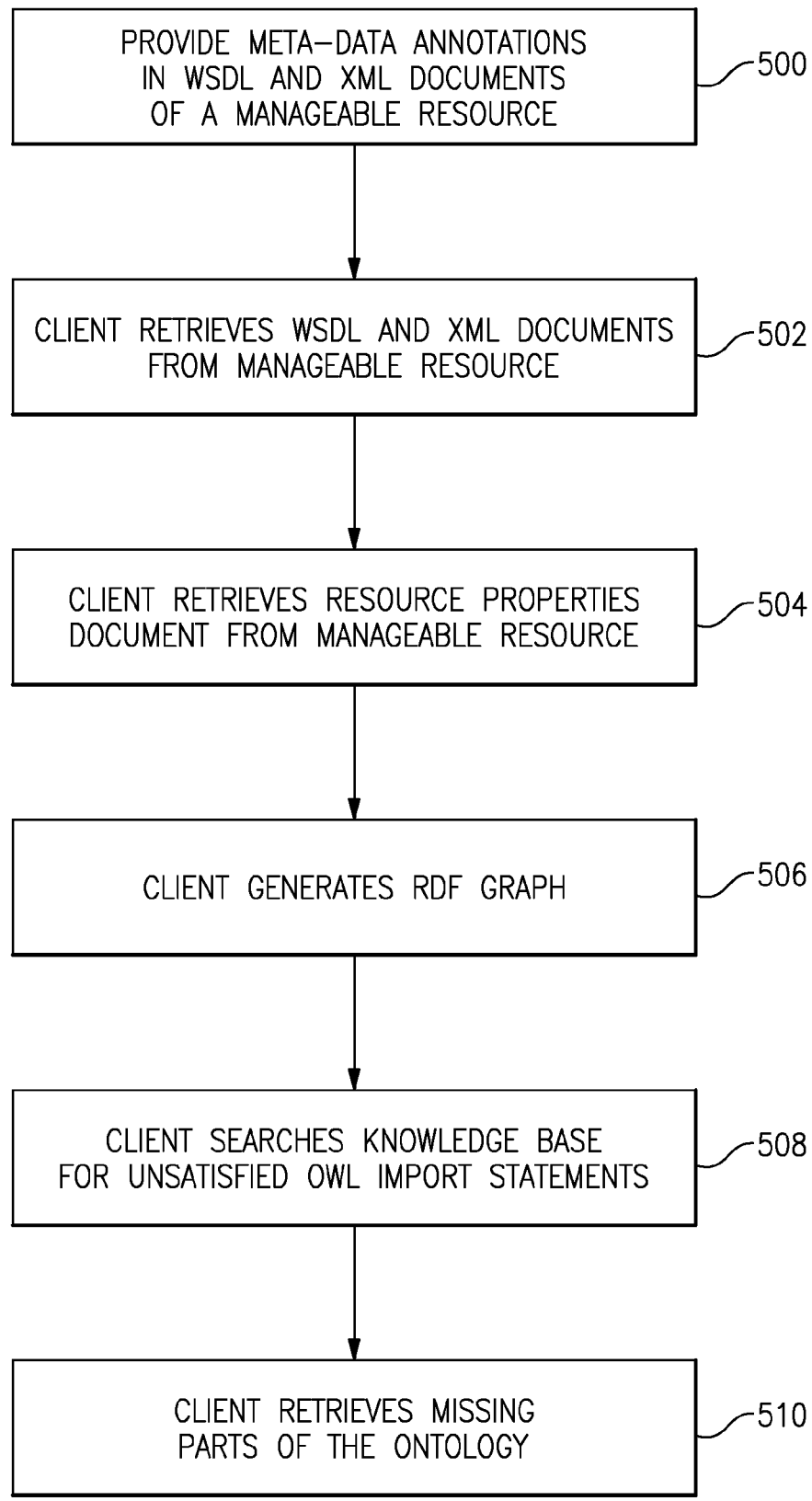
FIG. 5 is a flow diagram illustrating steps performed by an alternative method in accordance with the invention.

FIG. 5 shows a flow diagram illustrating basic steps performed by a method of generating a machine-processable semantic description of a manageable resource of an application domain. This flow diagram illustrates in particular the steps performed by a client that generates the semantic description of the manageable resource by itself. The flow diagram illustrates thus steps of the method in accordance with the invention described above with reference to FIG. 3 as alternative approach.

According to step 500 of the method in accordance with the invention, meta-data annotations are provided in the WSDL document and the XML schema document of the resource properties document of the manageable resource. According to step 502, the client retrieves the WSDL document and the XML schema document of the resource properties document. According to step 504, the client furthermore retrieves the resource properties document from the manageable resource which does not include a semantic description of aspects of the manageable resource and which is generated by the manageable resource in response to the client's request.

The client, subsequently, evaluates the XML schema document of the resource properties document, the WSDL document and the resource properties document and generates according to step 506 the RDF graph of the manageable resource by use of the semantic annotations in the two meta-data documents and the actual resource properties as provided by the resource properties document. The generated RDF graph comprises a set of RDF statements that describe semantically aspects of the manageable resource. The client searches according to step 506 a knowledge base that provides the ontology of the application domain for unsatisfied OWL import statements in the RDF graph and retrieves missing parts of the ontology that relate to the unsatisfied OWL import statements from the ontology according to step 510. Table 1, below provides a list of reference numerals for this, as way of example

TABLE 1

List of Reference Numerals

| | |
|---|---|
| 100 | Application domain |
| 102 | Client |
| 104 | Data processing system |
| 106 | IT infrastructure |
| 108 | Microprocessor |

TABLE 1-continued

List of Reference Numerals

| | |
|---|---|
| 110 | Storage |
| 112 | Operating system |
| 114 | Microprocessor |
| 116 | Storage |
| 118 | Operating system |
| 120 | Resource |
| 122 | Network connection |
| 124 | Network connection |
| 126 | Manageable resource |
| 128 | Ontology |
| 130 | Terminology |
| 132 | Set of aspects |
| 134 | Request |
| 136 | Semantic description |
| 138 | Rules |
| 140 | Computer program product |
| 142 | Knowledge base |
| 144 | Reasoner |
| 300 | Application domain |
| 302 | Client |
| 304 | Data processing system |
| 306 | Microprocessor |
| 308 | Storage |
| 310 | Microprocessor |
| 312 | Storage |
| 314 | Operating system |
| 316 | Knowlegde base |
| 318 | Computer program product |
| 319 | Reasoner |
| 320 | Manageable resource |
| 322 | Ontology service |
| 324 | Terminology |
| 325 | Rules |
| 326 | WSDL document |
| 328 | XML schema document |
| 330 | Resource properties document |
| 332 | Semantic description |
| 334 | RDF statements |
| 400 | Application domain |
| 402 | Data processing system |
| 403 | Ontology service |
| 404 | IT infrastructure |
| 406 | First manageable resource |
| 408 | Second manageable resource |
| 410 | First resource |
| 412 | Second resource |
| 414 | Type of manageable resource |
| 416 | Resource properties |
| 418 | Values of resource properties |
| 420 | Relationships |
| 422 | Operations |
| 424 | Ontology |
| 426 | Terminology |
| 428 | Rules |

While the preferred embodiment to the invention has been described, it will be understood that those skilled in the art may make various improvements and enhancements which fall within the scope of the present invention. These claims should be construed to maintain the proper protection for the invention first described.

What is claimed is:

1. A method for resource management comprising:
requesting by a client a semantic description for a manageable resource of an application domain, the manageable resource being associated with a resource of an IT infrastructure of the application domain and the manageable resource providing a web service through which the client can make use of the resource of the IT infrastructure, the semantic description being compliant with a terminology and one or more rules provided by an ontology for the application domain, wherein the manageable resource is characterized by a set of aspects and wherein the semantic description semantically describes the set of aspects;
responsive to the client request, obtaining by the client a semantic description for the manageable resource compliant to the terminology of the ontology to semantically describe the set of aspects; and
wherein the client further comprises a knowledge base and a reasoner, wherein the client stores the semantic description of the manageable resource in the knowledge base and wherein the method further comprises:
searching, by the client, the semantic description for import statements related to a part of the ontology, said ontology being created so that each part of the ontology relates to an import statement obtainable by the client on demand; and
storing in the reasoner rules related to the ontology, wherein the client invokes the reasoner and the knowledge base in understanding and subsequently processing the semantic description for using the manageable resource.

2. The method according to claim 1, wherein the manageable resource is hosted by a data processing system of the application domain, wherein the data processing system is linked with the client, wherein the semantic description is generated by the manageable resource responsive to the request from the client, and wherein the data processing system provides the semantic description to the client.

3. The method according to claim 2, wherein ontology is embodied in program-code of the manageable resource and wherein the manageable resource generates the semantic description according to the terminology as specified in the ontology.

4. The method according to claim 1, wherein the manageable resource is hosted by a data processing system of the application domain, wherein the data processing system is linked with the client, and wherein the obtaining the semantic description by the client comprises:
receiving semantic information from the data processing system by the client, the semantic information comprising meta-data annotations in a Web Service Definition Language (WSDL) document and further comprising an Extensible Markup Language (XML) schema document pertaining to resource properties of the manageable resource; and
generating, by the client, the semantic description of the manageable resource compliant to the terminology of the ontology from the received semantic information by using the meta-data annotated WSDL document and the meta-data annotated XML schema document.

5. The method according to claim 1, wherein the ontology comprises a class, said class being semantically described by use of the terminology, and further comprises a set of values relating to resource properties of the manageable resource and classified by value partitioning.

6. The method according to claim 5, wherein a resource property of the resource properties includes data-by-value information associated with a Web Ontology Language (OWL) data type property provided by the ontology.

7. The method according to claim 5, wherein the manageable resource is a first manageable resource of the application domain, wherein a resource property of the resource properties comprises data describing a relationship between the first manageable resource and a second manageable resource of the application domain, and wherein said relationship is provided by the ontology via an OWL object property that provides a semantic expression of the relationship.

8. The method according to claim 1, wherein operations provided by the manageable resource are provided in a set of at least one rule, said at least one rule corresponding to each operation of the operations provided by the manageable resource and said at least one rule providing meaning by specifying a set of terms for preconditions and effects.

9. The method according to claim 8, wherein the ontology comprises the terminology and rules and wherein the terminology is specified using a Web ontology Language (OWL).

10. The method according to claim 9, wherein the manageable resource is of a particular type represented by an OWL class, wherein the manageable resource has one or more resource properties associated therewith, and wherein each resource property of the one or more resource properties comprises literal data represented by an OWL datatype property and each resource property is represented by an OWL object property.

11. The method according to claim 10, wherein the particular type of the manageable resource is described as a Resource Description Framework (RDF) statement further comprising a predicate and an object, said predicate being an RDF type and the object being a Uniform Reference Identifier reference (URIref).

12. The method according to claim 11, wherein a rule comprises preconditions and effects which are described by triple patterns having a same structure as RDF statements, said triple patterns comprising URIrefs or variables that can be used as placeholders that can be bound by the reasoner.

13. The method according to claim 1, wherein the set of aspects is described by use of a set of Resource Description Framework (RDF) statements, said RDF statements building upon the terminology of the ontology.

14. The method according to claim 13, further comprising:

generating a semantic description for each manageable resource of the application domain, wherein each generated semantic description comprises a respective set of RDF statements which semantically describe the respective manageable resource including actual state and properties thereof; and integrating each generated semantic description into a semantic environment description.

15. A data processing system for facilitating resource management, the data processing system comprising:

a memory; and a processor in communication with the memory, wherein the data processing system is configured to perform:

receiving a request from a client for a semantic description for a manageable resource of an application domain, the manageable resource being associated with a resource of an IT infrastructure of the application domain and the manageable resource providing a web service through which the client can make use of the resource of the IT infrastructure, the semantic description being compliant with a terminology and one or more rules provided by an ontology for the application domain, wherein the manageable resource is characterized by a set of aspects and wherein the semantic description semantically describes the set of aspect;

responsive to receipt of the client request, providing to the client a semantic description for the manageable resource compliant to the terminology of the ontology to semantically describe the set of aspects; and wherein the client further comprises a knowledge base and a reasoner, wherein the client stores the semantic description of the manageable resource in the knowledge base and wherein the data processing system is further configured to perform:

searching, by the client, the semantic description for import statements related to a part of the ontology, said ontology being created so that each part of the ontology relates to an import statement obtainable by the client on demand; and storing in the reasoner rules related to the ontology, wherein the client invokes the reasoner and the knowledge base in understanding and subsequently processing the semantic description for using the manageable resource.

16. The data processing system according to claim 15, wherein the data processing system is linked with the client and wherein the semantic description is generated by the manageable resource in response to receipt of the request from the client, said data processing system being adapted to send the semantic description to the client.

17. The data processing system according to claim 16, wherein the client comprises a knowledge base and a reasoner and wherein the client is adapted to store the received semantic description of the manageable resource in the knowledge base, and is further adapted to search the semantic description for a set of import statements relating to a part of the ontology.

18. The data processing system according to claim 17, wherein each part of the ontology relating to an import statement is retrieved by the client on demand and stored in the knowledge base, wherein rules relating to the ontology are stored in the reasoner, and wherein the client is adapted to invoke the reasoner to perform interference on and processing of the parts of the ontology stored in the knowledge base for understanding the semantic information of the manageable resource and for using the manageable resource.

19. A computer program product for resource management, the computer program product comprising:

a non-transitory storage medium readable by a processor and storing instructions for execution by the processor to perform a method comprising:

requesting a semantic description for a manageable resource of an application domain, the manageable resource being associated with a resource of an IT infrastructure of the application domain and the manageable resource providing a web service through which the client can make use of the resource of the IT infrastructure, the semantic description being compliant with a terminology and one or more rules provided by an ontology for the application domain, wherein the manageable resource is characterized by a set of aspects and wherein the semantic description semantically describes the set of aspects;

responsive to requesting the semantic description, obtaining a semantic description for the manageable resource compliant to the terminology of the ontology to semantically describe the set of aspects; and wherein the client further comprises a knowledge base and a reasoner, wherein the client stores the semantic description of the manageable resource in the knowledge base and wherein the method further comprises:

searching, by the client, the semantic description for import statements related to a part of the ontology, said ontology being created so that each part of the ontology relates to an import statement obtainable by the client on demand; and storing in the reasoner rules related to the ontology, wherein the client invokes the reasoner and the knowledge base in understanding and subsequently processing the semantic description for using the manageable resource.

* * * * *